United States Patent
Iwata et al.

(10) Patent No.: US 6,924,800 B2
(45) Date of Patent: Aug. 2, 2005

(54) SHAPE PRODUCTION METHOD AND APPARATUS BY WINDOW DISPLAY

(75) Inventors: Midori Iwata, Saitama (JP); Kazuhiko Shibui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 09/858,962

(22) Filed: May 17, 2001

(65) Prior Publication Data

US 2002/0054042 A1 May 9, 2002

(30) Foreign Application Priority Data

May 17, 2000 (JP) .................................... 2000-145404

(51) Int. Cl.[7] .............................................. G06T 17/00
(52) U.S. Cl. ...................... 345/420; 345/419; 345/619; 715/782; 715/853
(58) Field of Search ................................ 345/419–427, 345/619, 964, 759, 750, 418, 440–441; 715/762, 853, 781–782, 764–765, 771–772

(56) References Cited

U.S. PATENT DOCUMENTS

| | | | | |
|---|---|---|---|---|
| 4,868,766 A | * | 9/1989 | Oosterholt | 345/420 |
| 5,412,762 A | * | 5/1995 | Kondo | 345/420 |
| 5,438,661 A | | 8/1995 | Ogawa | |
| 5,517,607 A | * | 5/1996 | Nishimura et al. | 345/853 |
| 5,689,711 A | * | 11/1997 | Bardasz et al. | 717/105 |
| 5,844,563 A | * | 12/1998 | Harada et al. | 345/420 |
| 5,995,097 A | * | 11/1999 | Tokumine et al. | 715/752 |
| 6,185,476 B1 | * | 2/2001 | Sakai | 700/182 |
| 6,285,369 B1 | * | 9/2001 | Kross et al. | 345/419 |
| 6,392,645 B1 | * | 5/2002 | Han et al. | 345/420 |

FOREIGN PATENT DOCUMENTS

| | | |
|---|---|---|
| EP | 0 375 460 A | 6/1990 |
| EP | 0 528 704 A | 2/1993 |
| JP | A883296 | 3/1996 |

OTHER PUBLICATIONS

D. Kurlander et al. "Editable Graphical Histories", Visual Languages, 1988, IEEE Workshop on . . . , Pittsburgh, PA, USA Oct. 10–12, 1988, Washington, D.C. USA, IEEE Comput. Soc. PR, Oct. 10, 1988, pp. 127–134.

* cited by examiner

Primary Examiner—Matthew C. Bella
Assistant Examiner—Po-Wei (Dennis) Chen
(74) Attorney, Agent, or Firm—Birch, Stewart, Kolasch & Birch, LLP

(57) ABSTRACT

To store and display shape data in different stages of a shaping operation to allow comparison and examination of plurality of operation plans to facilitate determination of a shape. A shape modification section modifies inputted shape data. The shape data for individual modifications are stored into a shape storage section, and shapes based on the shape data by the individual modifications are individually displayed in windows on a display screen. An element designation section designates an element in a unit of a face of the latest modified shape from among the modified shapes displayed in the windows. An element replacement section replaces an element of the latest shape having the same model information as model information of the element designated by the element designation section 50 with the designated element.

8 Claims, 10 Drawing Sheets

| MODEL SET NAME |
| MODEL NAME |
| ELEMENT NAME |

MODEL INFORMATION FRAME F1

| COMPOSING NUMBER OF FACES |
| DEGREE OF FACES |
| TYPE OF FACES |
| ⋮ |

FACE INFORMATION FRAME F2

FIG. 12

| REPLACEMENT INFORMATION FILE |
| ID OF SHARED MEMORY |
| KEY OF SHARED MEMORY |
| TOTAL SIZE OF FACES |
| NUMBER OF FACES |
| SIZE OF EACH FACE |

SHAPE PRODUCTION METHOD AND APPARATUS BY WINDOW DISPLAY

BACKGROUND OF THE INVENTION

1. Field of the Invention

This invention relates to a shape production method and apparatus by a window display, and more particularly to a shape production method and apparatus by a window display suitable to compare and examine a plurality of shapes produced in a process of production to modify a shape.

2. Description of Background Art

A method of facilitating modification to a shape produced formerly or production of a similar shape in a designing operation for producing a three-dimensional shape making use of a computer has been proposed. According to a method disclosed in, for example, Japanese Patent Laid-Open No. Hei 8-83296, an operation of a shape is performed in the following procedure. First, when an operation of a shape is performed, in addition to shape data, an operation history including parameters and so forth used for the shape operation is stored together with an ID (identification information). Then, when the shape is to be modified, a parameter in the operation history is changed or part of the operation history is deleted to change the operation history. Finally, a shaping operation is automatically executed in accordance with the changed operation history.

According to the shape production method disclosed in the Japanese Patent Laid-Open document mentioned above, the shape at any point of the shaping operation can be regenerated by tracing the operation history retrospectively. However, since this method regenerates the operation history and actually modifies the shape itself in the current stage based on the history, it cannot satisfy a demand, for example, that a plurality of designers evaluate a plurality of shape plans simultaneously and when necessary to obtain an optimum shape.

SUMMARY AND OBJECTS OF THE INVENTION

It is an object of the present invention to eliminate the problem of the conventional method and apparatus and provide a shape production method and apparatus by a window display by which a plurality of shape plans can be visually evaluated simultaneously to output an optimum shape.

In order to attain the object described above the present invention has the first characteristic in that inputted shape data is modified, and shape data in different modification stages is displayed individually as shape histories in different windows. The present invention has the second characteristic in that an element is designated in a unit of a predetermined face on the latest modified shape from among the modified shapes displayed in the windows, and an element of the latest shape having the same model information as model information of the designated element is replaced with the designated element.

According to the first characteristic, shape data in different modification stages can be observed by sight. Further, according to the second characteristic, for example, the contents of the window displays can be observed for comparison to select shape data in a unit of a face, and by replacing the latest data with part of the selected shape data, the latest shape data can be modified rapidly and besides objectively through comparison with the other shape data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
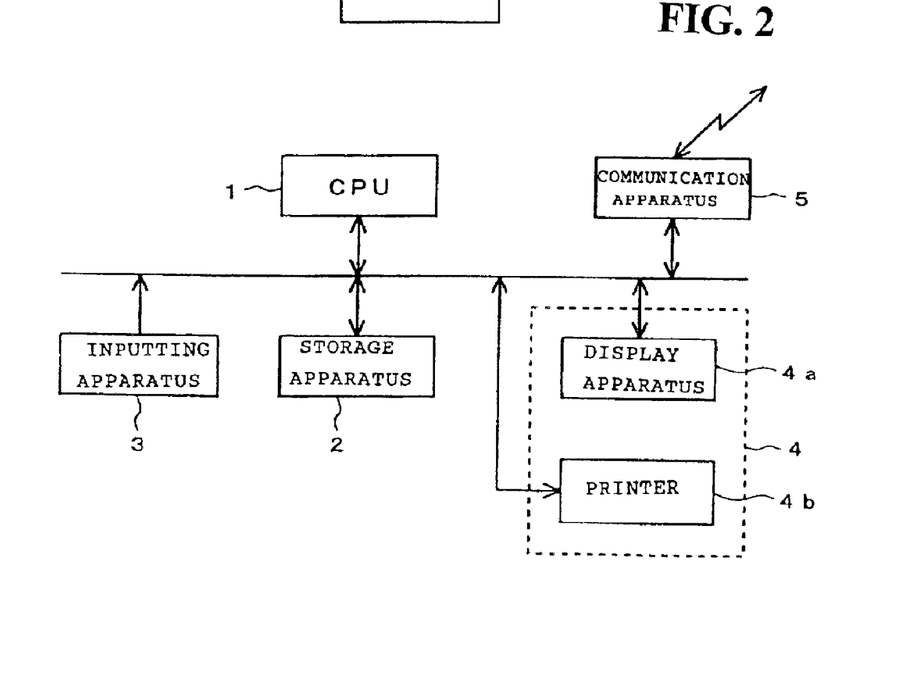
FIG. 2 is a block diagram showing a hardware configuration of essential part of the shape production apparatus according to the embodiment of the present invention.

In the following, an embodiment of the present invention is described with reference to drawings. FIG. 2 is a block diagram showing a configuration of a shape production apparatus according to the embodiment of the present invention. The shape production apparatus is formed from an arithmetic unit (CPU) 1, a storage apparatus 2, an inputting apparatus 3, and an outputting apparatus 4 and can also include a communication apparatus 5. The storage apparatus 2 is formed from an auxiliary storage apparatus such as a memory, a hard disk apparatus or the like for storing a program used for an arithmetic operation by the CPU 1, data, parameters and the like for arithmetic operation, and data of a produced shape. The inputting apparatus 3 includes a keyboard, a mouse and the like. A CRT or a liquid crystal display apparatus 4a and a printer 4b may be provided as the outputting apparatus 4. The communication apparatus 5 may be provided with a function for connecting the shape production apparatus to another apparatus of a similar type directly or indirectly through a network. Information inputted from the inputting apparatus 3 by a user while the user observes the display apparatus 4a is processed by the CPU 1, and a result of the processing, that is, data of a shape and so forth are stored into the storage apparatus 2 and is outputted to the outputting apparatus 4.

Figure 1:
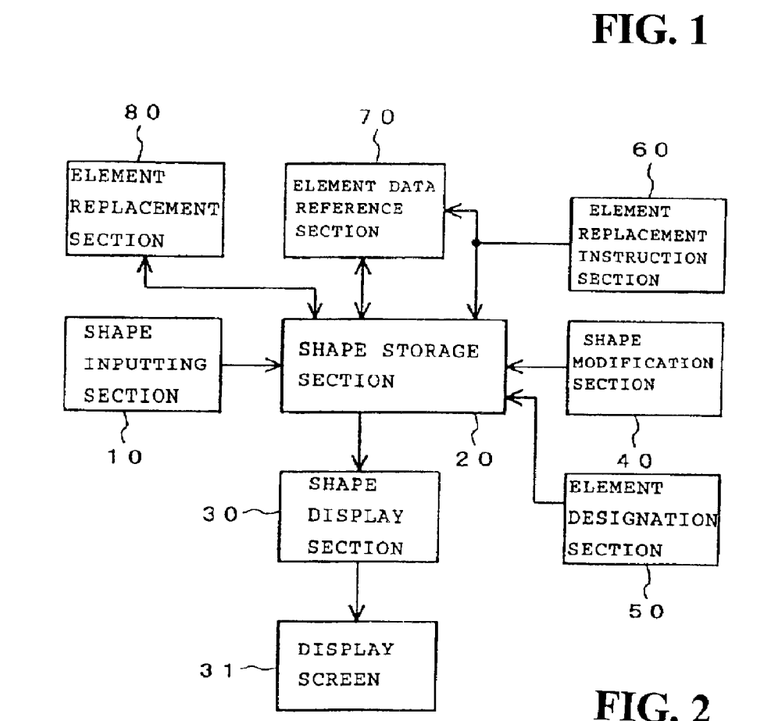
FIG. 1 is a block diagram showing functions of essential part of a shape production apparatus according to an embodiment of the present invention.

FIG. 1 is a functional block diagram showing essential part of the shape production apparatus of the present embodiment. A shape inputting section 10 is realized by the inputting apparatus 3 described above or the like. A model inputted from the shape inputting section 10 is stored into a shape storage section 20. The stored model is displayed on a display screen 31 by a shape displaying section 30. Modification to the model is performed by a shape modification section 40. The amended model is stored into the shape storage section 20 each time the modification just described is performed and is displayed on the display screen 31. In other words, a shape history of the model is stored and is displayed. The modification to the model is performed in a unit of an element of a predetermined size. Shape histories are displayed in a plurality of windows opened on the display screen 31 by the shape displaying section 30.

A part, that is, an element, of a model displayed in a window can be selected by an element designation section 50. If an element is designated by the element designation section 50 and an element replacement instruction section 60 is urged, then an element data reference section 70 is started up. The element data reference section 70 discriminates whether or not a model being operated at present includes an element which coincides with the element designated by the element designation section 50. If the two elements coincide with each other, then an element replacement section 80 replaces the pertaining element of the model being operated at present with the element designated by the element designation section 50. If the two elements do not coincide with each other, then an error process is performed.

Figure 3:
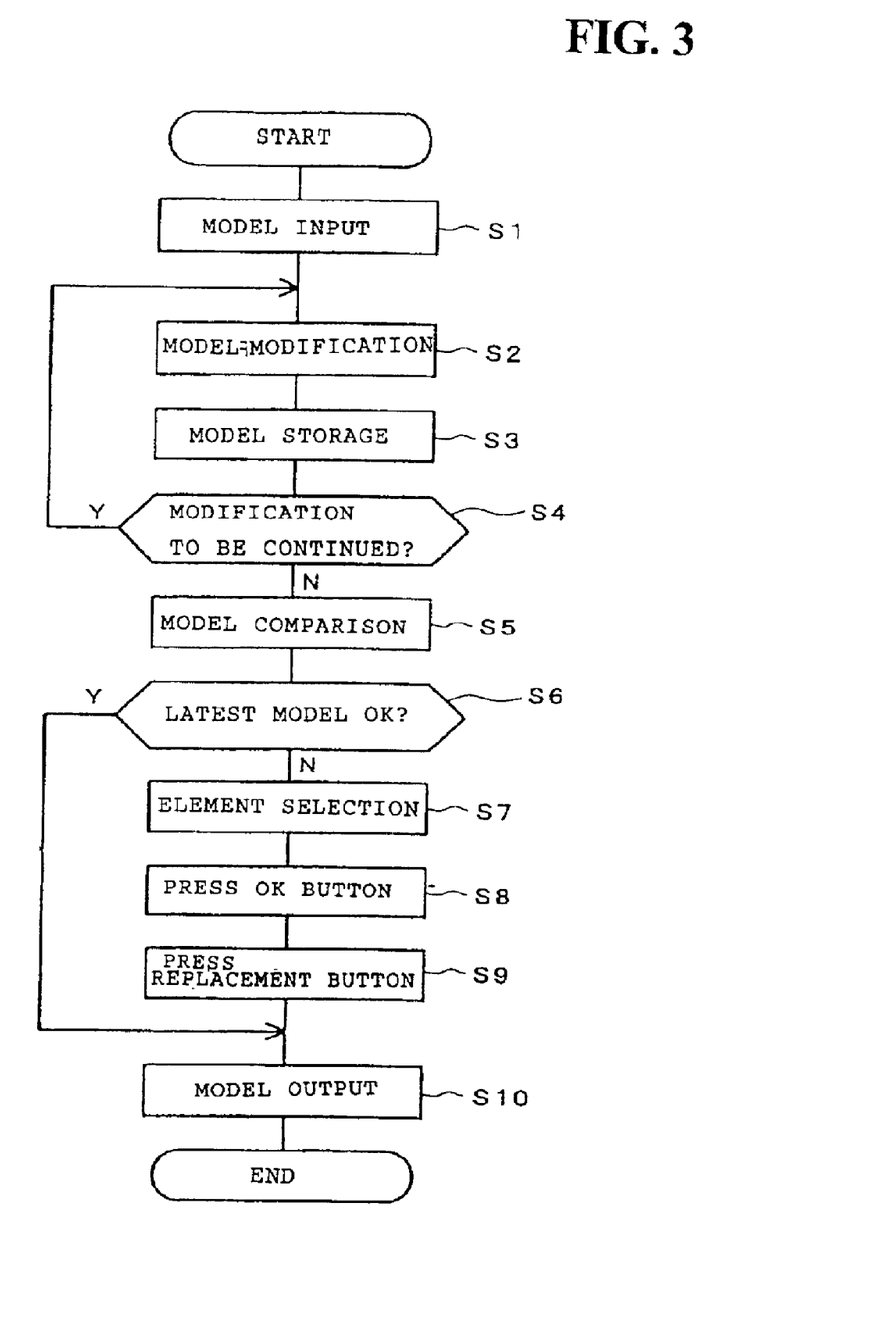
FIG. 3 is a flow chart illustrating a shape operation procedure.
Figure 4:
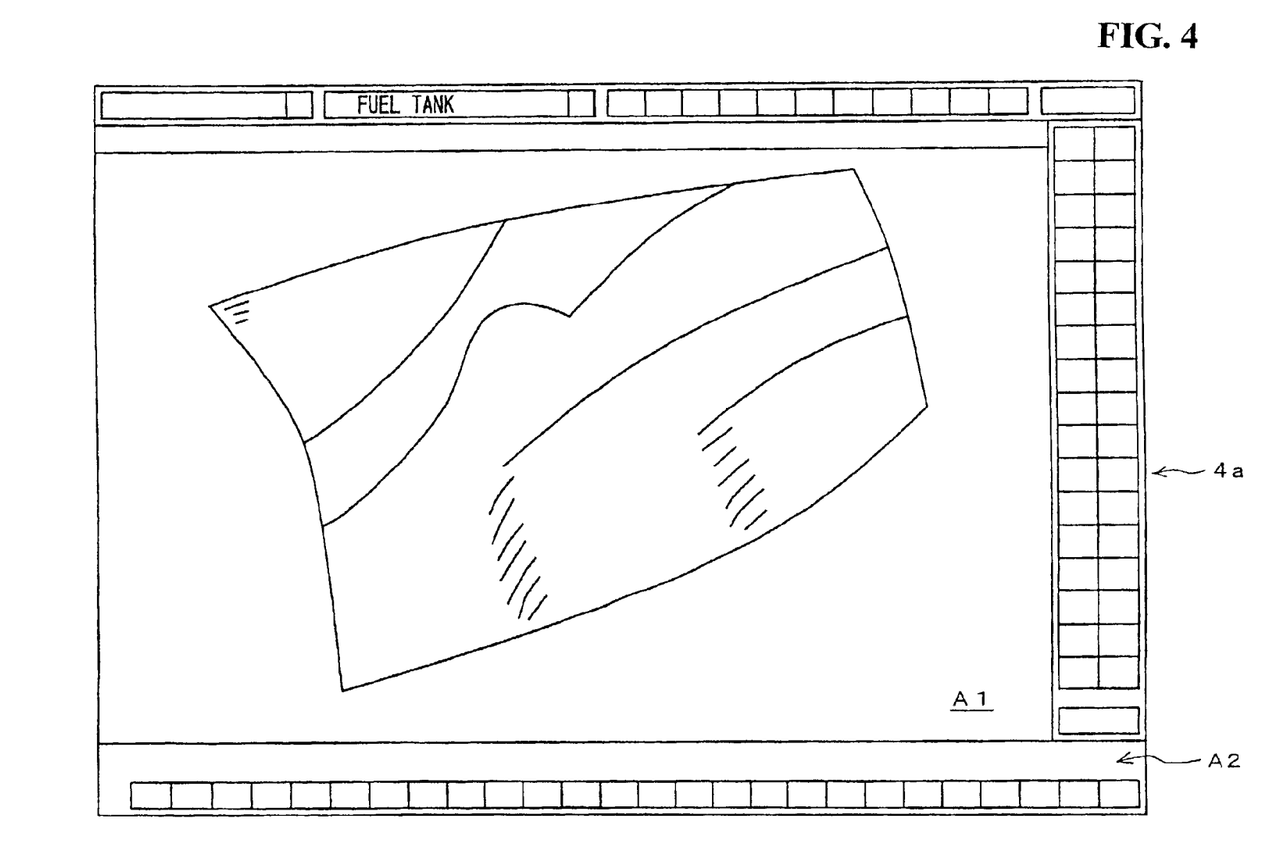
FIG. 4 is a view showing a display apparatus in which an example of shape in an operation stage is displayed.

FIG. 3 is a flow chart illustrating an operational procedure of a user, and FIGS. 4 to 9 are views showing image display examples of the display apparatus 4a by operations. As shown in FIG. 4, the display apparatus 4a includes a region A1 for displaying an image of a shape, and another region A2 disposed on at least one side of the region A1 and including operation icons and buttons. A user will operate a shape in an interactive mode in accordance with a plotting program set in advance.

Figure 5:
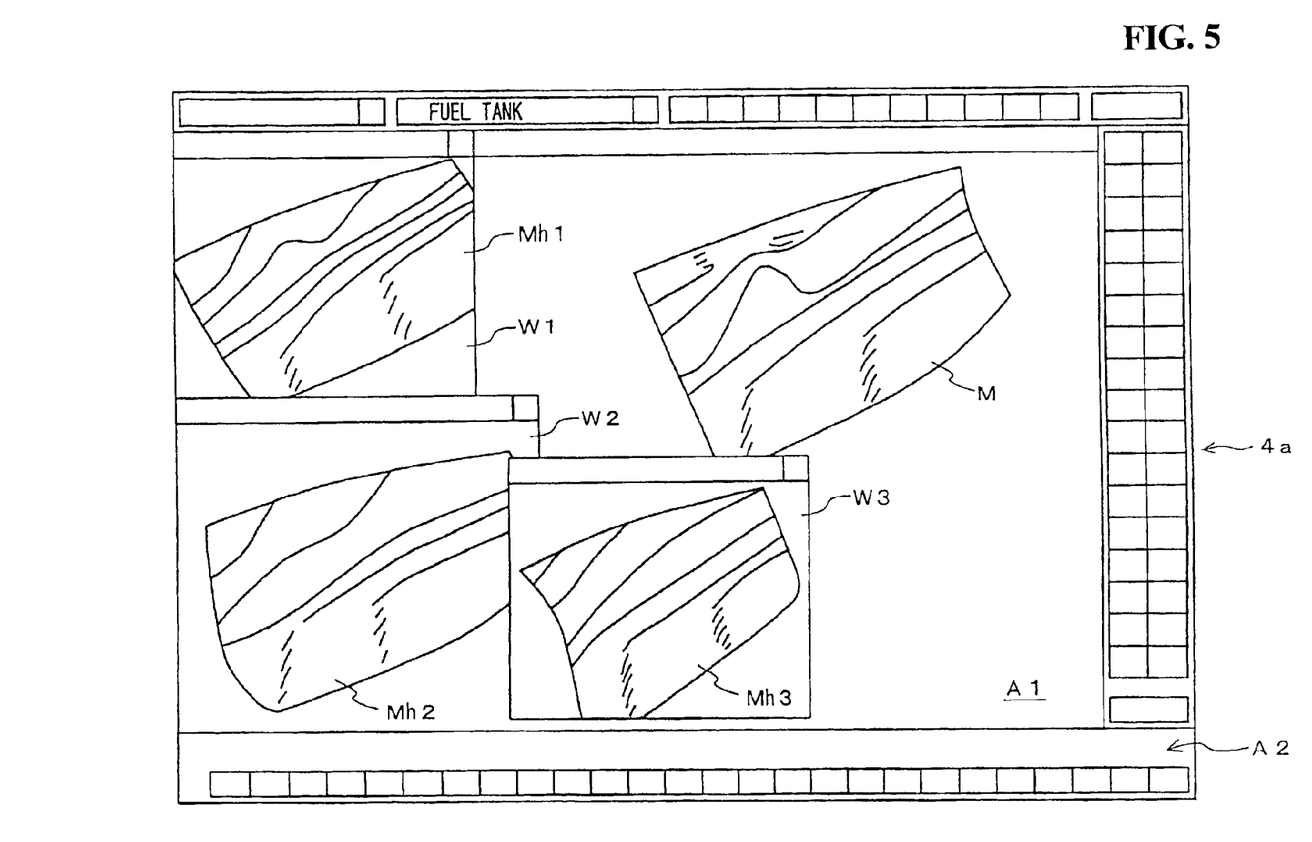
FIG. 5 is a view of the display apparatus in which examples of shape in a plurality of operation stages are displayed.

Referring to FIG. 3, in step S1, the inputting apparatus 3 will be used to input shape data (a model). The model may be a new shape produced by the user or may be a model produced separately or formerly and stored in the storage apparatus 2 or the like. The inputted model is displayed on the display apparatus 4. The model is such a curved face shape as shown in FIG. 4, for example, a partial shape of a fuel tank of a motorcycle, and is represented with shading so that the curvature and so forth of the curved face can be recognized readily. In step S2, the model displayed on the display apparatus 4 is modified. In step S3, the modified model is stored as a shape history into the storage apparatus 2. When the model is stored into the storage apparatus 2, a window is opened newly and displayed on the display apparatus 4. FIG. 5 is a view showing an example wherein shape histories Mh1, Mh2 and Mh3 of the modified model are displayed in a plurality of windows W1 to W3, respectively, in addition to the latest model M.

In S4, the user will input an instruction of whether the modification to the model should be continued or ended. If the modification to the model should be continued, then the processing returns to the operation in step S2, but if the modification should be ended, the models displayed on the display apparatus 4 will be compared with each other in step S5. The models in the individual windows are displayed three-dimensionally and can be compared with each other with the angle thereof varied by a rotating operation.

In step S6, the user will instruct whether or not the latest model is acceptable (OK). If the latest model is acceptable, then it is outputted and/or stored (step S10). The destination of the storage of the latest model determined to be acceptable is not limited to the storage apparatus 2 but may be a server or the like connected to the network. Further, the modified model can be displayed not only on the shape production apparatus being operated by the user but also on the display apparatus 4 on another shape production apparatus connected to the shape production apparatus. Where the modified model is displayed on another shape production apparatus, a plurality of plans produced by a plurality of users can be compared and examined in step S5.

Figure 6:
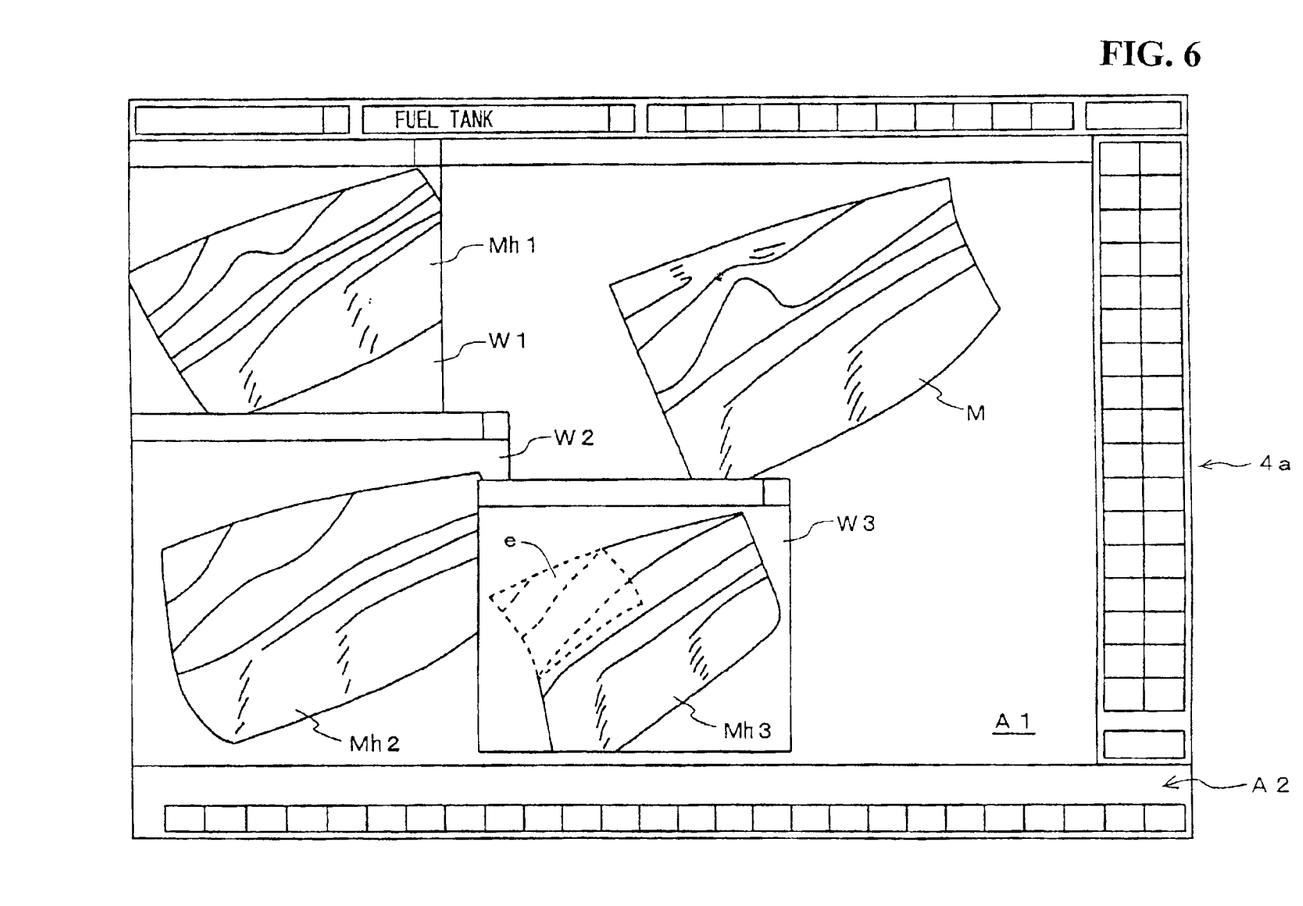
FIG. 6 is a view of the display apparatus illustrating a state in which a face of a shape is selected.
Figure 7:
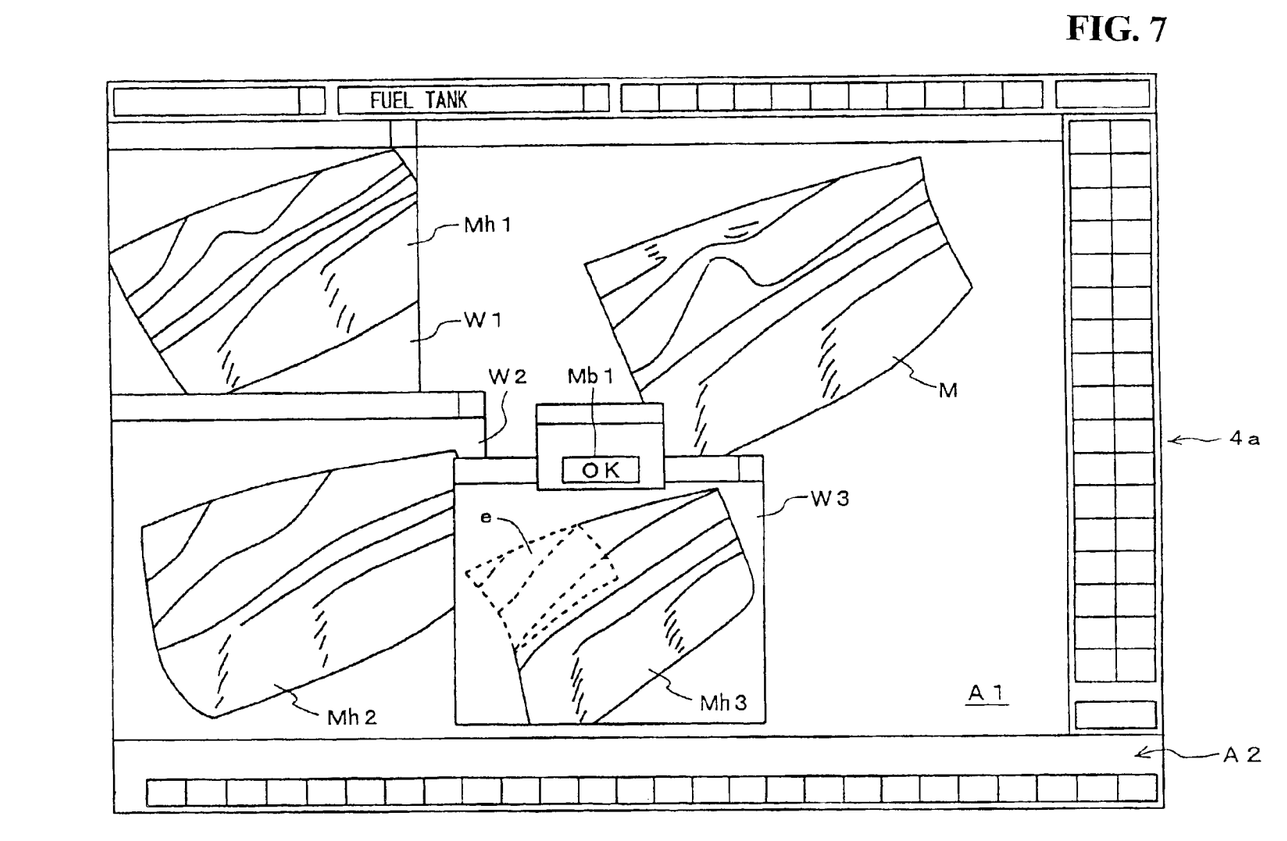
FIG. 7 is a view of the display apparatus in which an "OK" button for confirmation instruction is displayed.

If it is discriminated that not the latest model but another model in an intermediate stage is better, then the processing advances to step S7, in which one of the shape histories Mh1, Mh2 and Mh3 displayed in the windows is selected and an element is designated. The designation of a shape history can be performed in a unit of an element, that is, a unit of a face of a size set in advance. FIG. 6 is a view showing an example wherein an element e of the shape history Mh3 from among the shape histories Mh1, Mh2 and Mh3 is selected.

Figure 8:
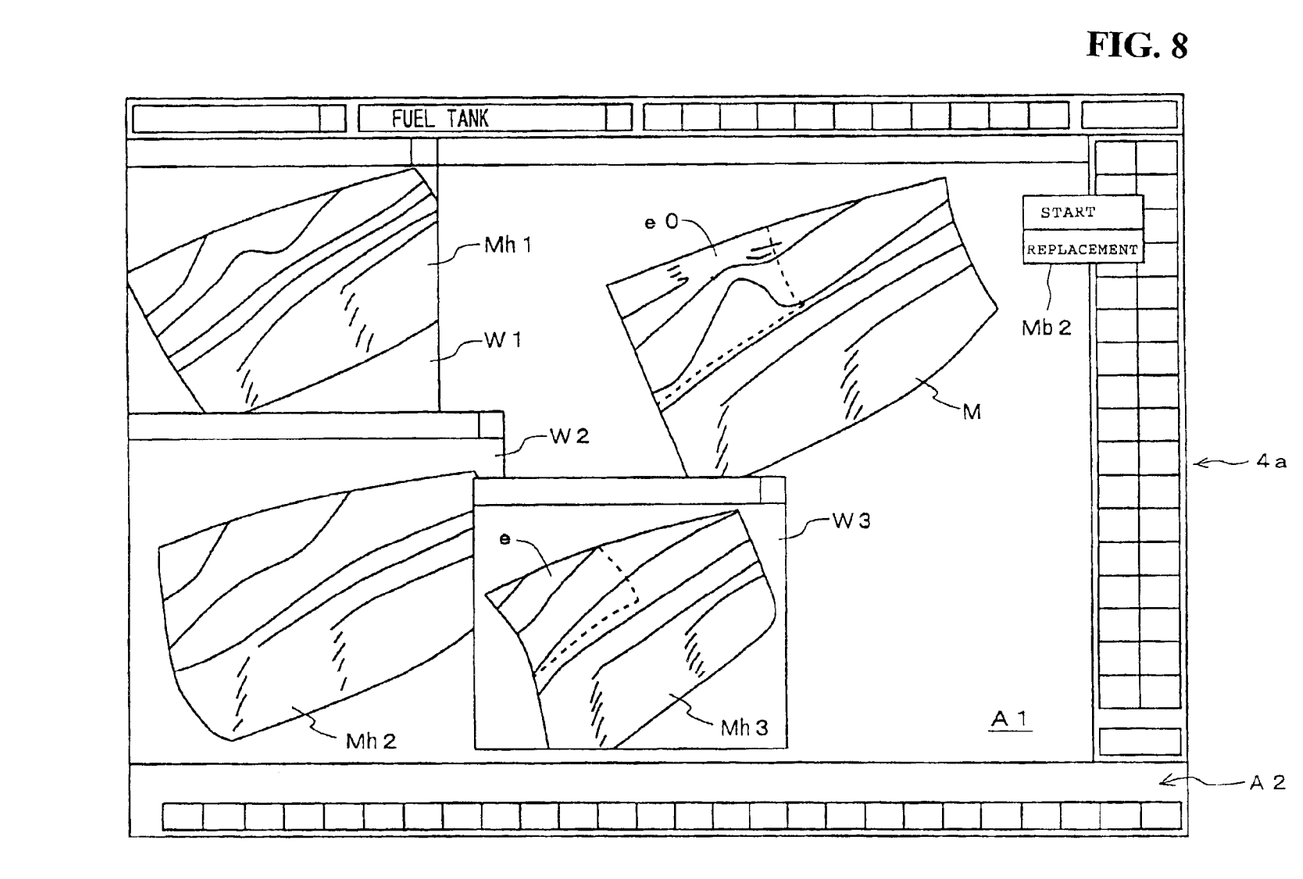
FIG. 8 is a view of the display apparatus in which a replacement button is displayed.
Figure 9:
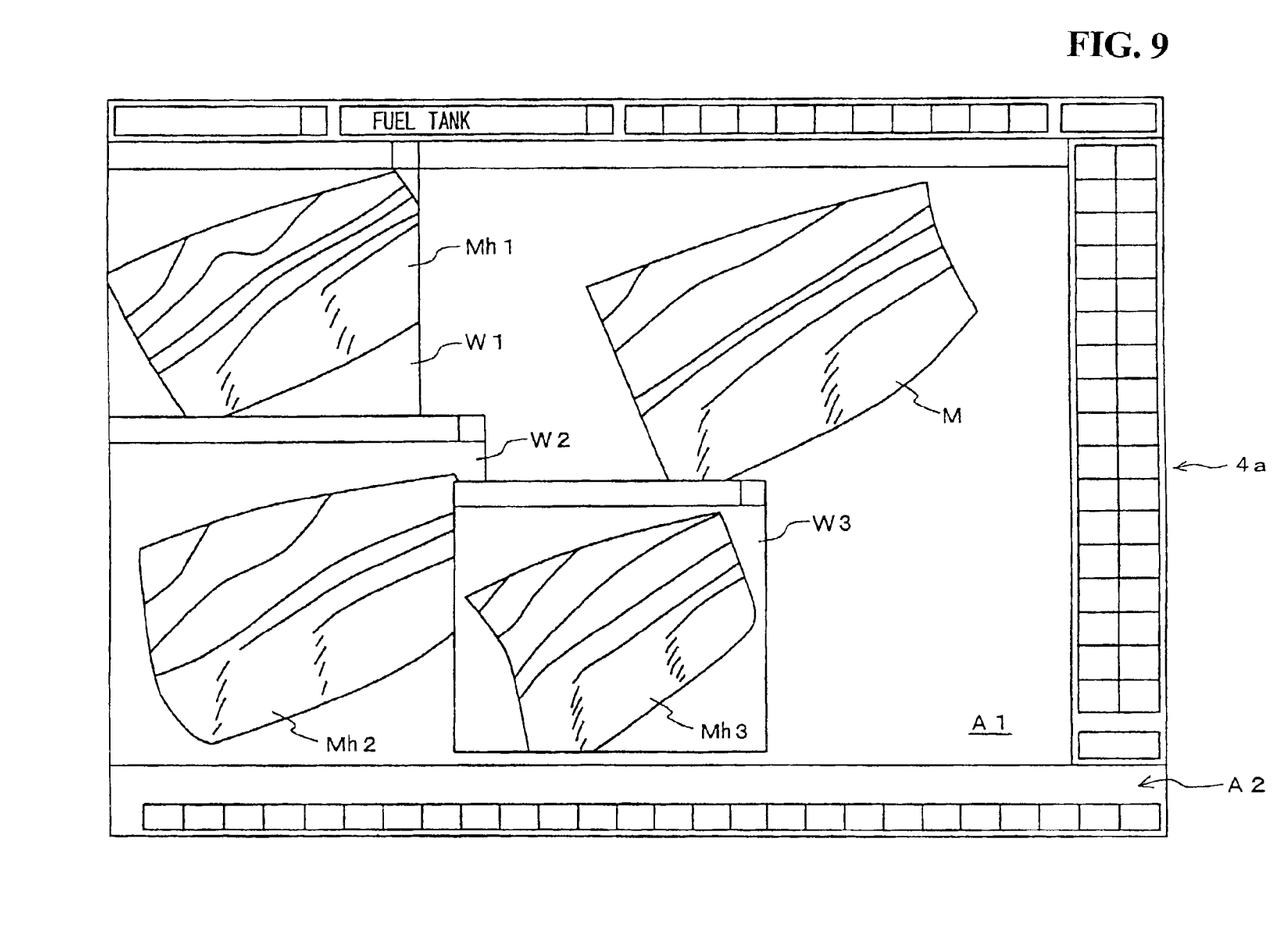
FIG. 9 is a view of the display apparatus including a display of a replaced shape.

If the selection of an element comes to an end, then since an "OK" button Mb1 for instruction of confirmation of whether or not the selection is reasonable is displayed in the area region Al of the display apparatus 4a (FIG. 7), the processing advances to step S8, in which the "OK" button Mb1 will be pressed. Then, since a "start or replacement" button Mb2 shown in FIG. 8 is displayed, the "replacement" portion of the button Mb2 will be pressed in step S9 to replace the element eO of the latest model M with the element e of the shape history Mh3. In step SLO, the latest model with the element replaced is outputted to the outputting apparatus 4. FIG. 9 shows an example of an output of the latest model M and shape history wherein the element eO is replaced with the element e of the shape history Mh3.

Figure 10:
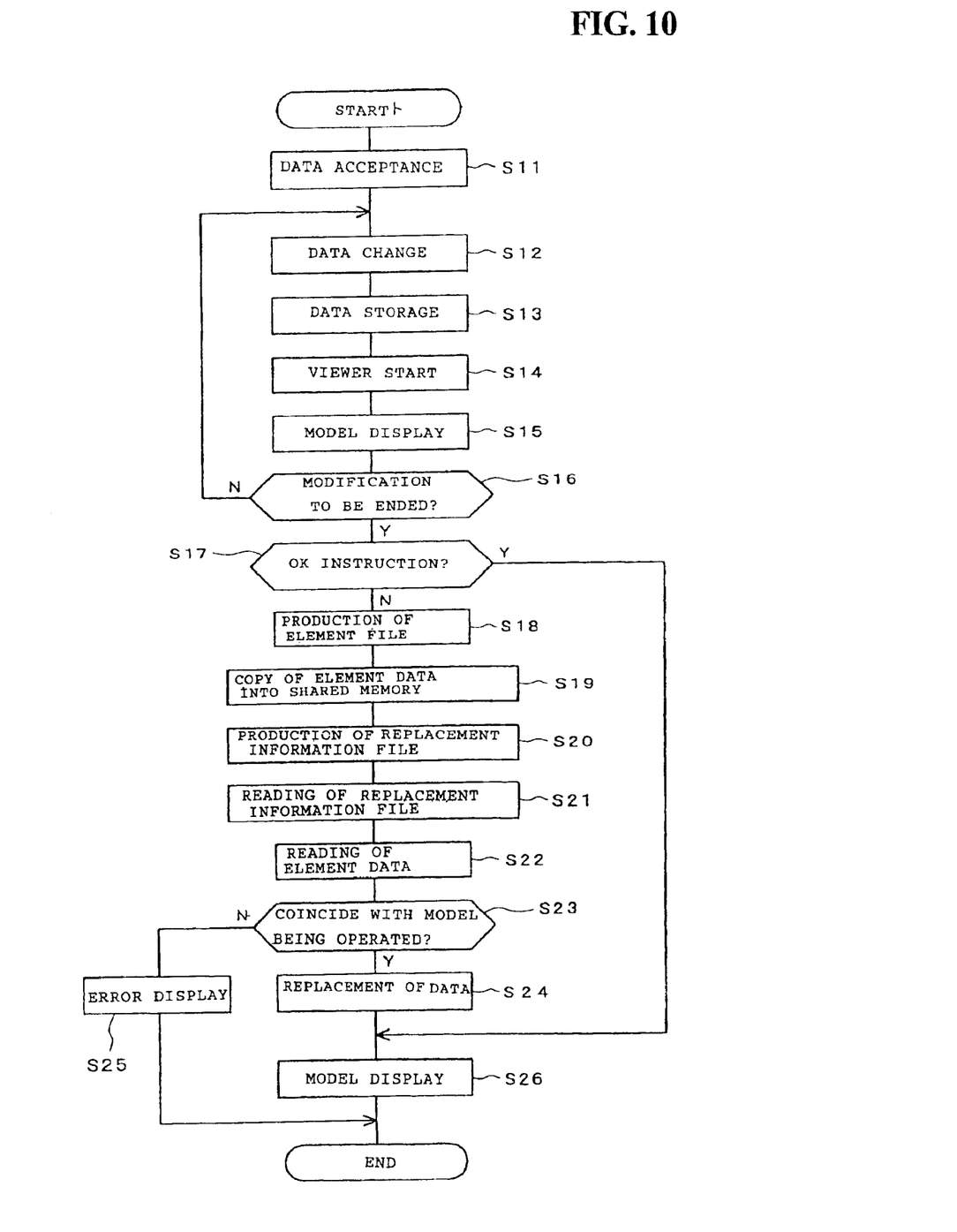
FIG. 10 is a flow chart illustrating processing of a system corresponding to a shaping operation.

Subsequently, processing of the CPU 1 corresponding to the operations of the user described above is described. FIG. 10 is a flow chart of the essential processing of the CPU 1. In step S11, the CPU 1 executes a face editing process to accept data of a model in response to an instruction from the inputting apparatus 3 by an operation of the user. In step S12, the CPU 1 changes the data of the model in response to an instruction from the inputting apparatus 3 by an operation of the user. In step S13, the CPU 1 stores the data of the model M into the storage apparatus 2 in response to a model storage instruction. Further, in step S14, the CPU 1 starts up a process (viewer) for accessing/confirming a file on the storage apparatus 2. In step S15, the CPU 1 reads out the data of the model M and displays the model M in a window on the display apparatus 4a. In step S16, the CPU 1 discriminates whether or not the modification should be ended, and if the modification should be ended, then the processing advances to step S17. In this manner, in steps S12 to S15, a number of windows equal to the number of times of change are opened and the shape histories are stored and displayed.

Figure 11:
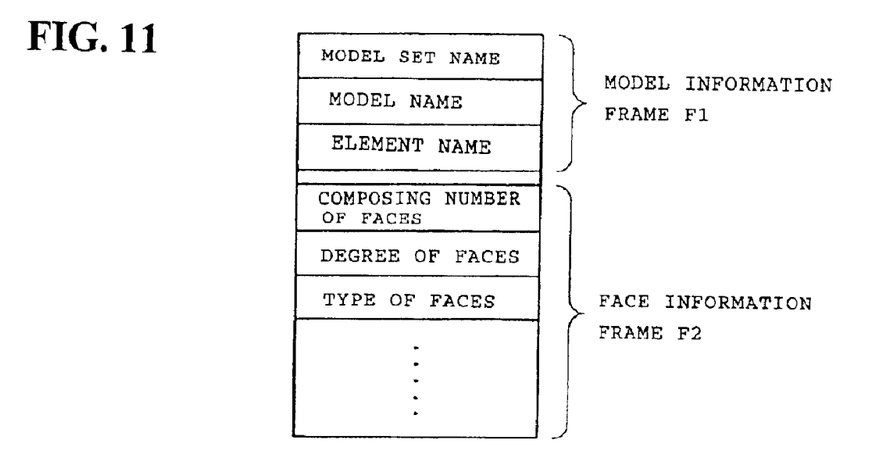
FIG. 11 is a view showing a structure of a file stored in a shared memory.

In step S17, the CPU 1 waits for an instruction of whether or not the latest data is acceptable. If the latest data is acceptable, then the processing advances to step S26, but if the latest data is not acceptable, then the processing advances to step S18. In step S18, the CPU 1 produces a file for stacking the selected element, that is, partial data (element data) of the model, in a shared memory. It is to be noted that the shared memory is used as a communication means for making it possible to exchange information between a plurality of processes such as the face editing processing and the viewer. FIG. 11 is a view illustrating a structure of files to be stacked.

The element data stored in the shared memory includes a model information frame F1 and a face information frame F2. In the model information frame F1, a model set name, a model name and an element name are described as information for specifying an element. Meanwhile, in the face information frame F2, a composing number of faces, the degree of faces, the type of faces and so forth are described as an expression of faces which compose the element. It is to be noted that, as the model set name, for example, a "fuel tank" which is a name of a component of a motorcycle is described; as the model name, a name of a part of the fuel tank is described; and further, as the element name, a name of a portion of the part of the fuel tank is described. In the shared memory, a number of element data of the structure described equal to the number of selected elements are stored.

Figure 12:
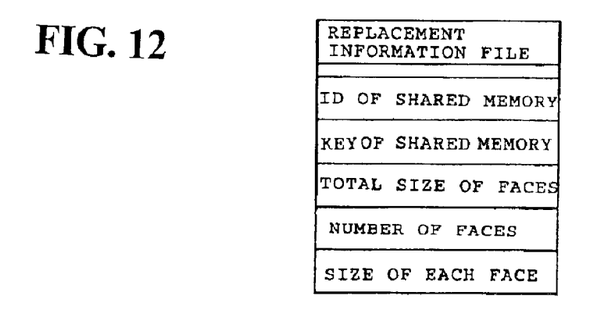
FIG. 12 is a view showing an example of a replacement information file produced on the shared memory.

In step S19, the element data are copied into the shared memory. At this time, the CPU 1 produces a replacement information file together with the element data to be stacked (step S20). FIG. 12 shows an example of a replacement information file, which is produced in the shared memory such that it can be referred from both of the viewer and the face editing process. In the replacement information file, an ID of the shared memory, key information of the shared memory, a total size of the selected faces, the number of selected faces, and the size of each of the selected faces are described.

In step S21, the face editing process is executed, and the CPU 1 reads the replacement information file in response to a replacement instruction. In step S22, the CPU 1 refers to the replacement information file to read the element data of the shared memory. In step S23, the CPU 1 discriminates whether or not the model being operated at present includes data which coincides with the element data. This discrimination is performed by comparison between the model information frame F1 and the element data being operated at present. If coincidence between the data is detected, then the discrimination in step S23 is affirmative, and the processing advances to step S24, in which the element data in the model being operated at present is replaced with the information of the face information frame F2. If coincidence of the data is not detected, then the discrimination in step S23 is negative, and the CPU 1 performs an error display (step S25). In step S26, the model with the data replaced is displayed.

According to the present embodiment, when each operation stage comes to an end, the viewer is started up so that shape data is filed and displayed automatically. Accordingly, the user need not take time to change a file name and store the file of the changed file name each time it performs a shape operation, and therefore, the operation is simple.

As is apparent from the foregoing description, according to the present invention, since the shape data in different modification stages can be observed by sight, the shapes in the different modification stages displayed in the windows can be observed for comparison and examined.

According to the present invention, the shapes at the different modification stages displayed in the windows can be observed for comparison to select a shape in a unit of a face, and by replacing the latest data with the selected part of the shape data, the latest shape data can be modified rapidly and objectively through comparison with the other shape data. Further, where the shape of a unit of a face is replaced, the entire shape balance can be suitably evaluated through observation.

Furthermore, according to the present invention, different from a modification operation which is performed in accordance with a history stored in a unit of an operational procedure, it is possible to discriminate while observing actual shapes and immediately extract and replace the shape. In short, a rapid and precise shaping operation based on the sense of sight can be performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shape production method by a window display comprising the following steps:

inputting modified shape data to create a plurality of alternative models of a body, each of the alternative models representing the body in a different modification stage;

individually displaying each of the alternative models of the body as shape histories in different windows;

designating an element in a unit of a predetermined face on a latest one of the alternative models of the body displayed in one of the windows from among other ones of the alternative models displayed in others of the windows;

confirming the element designated by pressing a confirmation button on a display screen; and replacing an element of the latest one of the alternative models in one of the windows having the same model information as model information of the designated element with the designated element from one of the other alternative models displayed in one of the other windows by pressing a replacement button on the display screen, wherein the shape data for the individual modifications includes a model information frame (F1) and a face information frame (F2), the model information frame (F1) having a model set name, a model name and an element name, and the face information frame (F2) having a number of faces composing each of the elements, degrees of the faces, and types of the faces.

2. The shape production method by a window display according to claim 1, and further including the following steps:

copying the element designated from the latest one of the alternative models and the element designated from the other of the alternative models into the shape storage means, and determining whether or not each of the elements designated have the same model information.

3. A shape production apparatus by a window display comprising shape modification means for modifying inputted shape data thereby creating multiple alternative models of a body, each of the alternative models representing the body in a different modification stage;

shape storage means for storing shape data for individual modifications;

display means for individually displaying the multiple alternative models of the body in different windows;

element designation means for designating an element in a unit of a predetermined face on a latest one of the alternative models of the body displayed in one of the windows from among others of the alternative models displayed in others of the windows; and element replacement means for replacing an element of the latest one of the alternative models displayed in one of the windows having the same model information as model information of the element designated by said element designation means with the designated element from one of the other alternative models displayed in one of the other windows, the element replacement means displaying an error message when the designated element from the latest one of the alternative models does not have the same model information as the model information of the designated element of the one of the other alternative models, wherein the shape data for the individual modifications includes a model information frame (F1) and a face information frame (F2), the model information frame (F1) having a model set name, a model name and an element name, and the face information frame (F2) having a number of faces composing each of the elements, degrees of the faces, and types of the faces.

4. The shape production apparatus by a window display according to claim 3, and further including:

computing means for copying the element designated from the latest one of the alternative models and the element designated from the other of the alternative models into the shape storage means, and comparing means to determine whether or not each of the elements designated have the same model information.

5. A shape production method by a window display comprising the following steps:

inputting modified shape data to create a plurality of alternative models of a body, each of the alternative models representing the body in a different modification stage; and individually displaying each of the plurality of alternative models of the body as shape histories, which can be visually evaluated simultaneously in a plurality of windows to output an optimum shape;

designating an element in a unit of a predetermined face on a latest one of the alternative models of the body displayed in one of the windows from among other ones of the alternative models displayed in others of the windows; and replacing an element designated from the latest one of the alternative models in one of the windows having the same model information as model information with the designated element from one of the other alternative models displayed in one of the other windows;

displaying an error message when the designated element from the latest one of the alternative models does not have the same model information as the model information of the designated element from the one of the other alternative models; and storing the designated element of the one of the other alternative models in a replacement information file, the replacement information file including an ID of a shared memory of the shape storage means, key information of the shared memory, a total size of selected faces, a number of selected faces, and a size of each of the selected faces.

6. The shape production method by a window display according to claim 5, and further including the following steps:

copying the element designated from the latest one of the alternative models and the element designated from the one other of the alternative models into the shape storage means, and determining whether or not each of the elements designated have the same model information.

7. A shape production apparatus by a window display comprising shape modification means for modifying inputted shape data thereby creating multiple alternative models of a body, each the alternative models representing the body in a different modification stage;

shape storage means for storing shape data for individual modifications; and display means for individually displaying the multiple alternative models of the body for visually evaluating the shapes simultaneously in a plurality of windows to output an optimum shape;

element designation means for designating an element in a unit of a predetermined face on a latest one of the alternative models of the body displayed in one of the windows from among others of the alternative models displayed in others of the windows by pressing a confirmation button on the display means; and element replacement means for replacing an element designated from the latest one of the alternative models displayed in one of the windows having the same model information as model information of the element designated by said element designation means with the designated element from one of the other alternative models displayed in one of the other windows by pressing a replacement button on the display means, wherein the designated element of the one of the other alternative models is stored in a replacement information file, the replacement information file including an ID of a shared memory of the shape storage means, key information of the shared memory, a total size of selected faces, a number of selected faces, and a size of each of the selected faces.

8. The shape production apparatus by a window display according to claim 7, and further including:

computing means for copying the element designated from the latest one of the alternative models and the element designated from the one other of the alternative models into the shape storage means, and comparing means to determine whether or not each of the elements designated have the same model information.

* * * * *